United States Patent [19]
Gluntz et al.

[11] Patent Number: 5,295,168
[45] Date of Patent: Mar. 15, 1994

[54] PRESSURE SUPPRESSION CONTAINMENT SYSTEM

[75] Inventors: Douglas M. Gluntz; Harold E. Townsend, both of San Jose, Calif.

[73] Assignee: General Electric Company, San Jose, Calif.

[21] Appl. No.: 46,317

[22] Filed: Apr. 15, 1993

[51] Int. Cl.$^5$ ............................................... G21C 15/18
[52] U.S. Cl. ............................................... 376/283
[58] Field of Search ............... 376/283, 299, 298, 293, 376/282

[56] References Cited

U.S. PATENT DOCUMENTS

| | | | |
|---|---|---|---|
| 5,008,069 | 4/1991 | Fredell | 376/299 |
| 5,059,385 | 10/1991 | Gluntz et al. | 376/282 |
| 5,082,619 | 1/1992 | Sawyer | 376/283 |
| 5,096,659 | 3/1992 | Hidaka et al. | 376/283 |
| 5,102,617 | 4/1992 | Gluntz et al. | 376/283 |
| 5,169,595 | 12/1992 | Cooke | 376/282 |

OTHER PUBLICATIONS

GE Nuclear Energy, "SBWR Technical Description for NRC Staff Presentation," Dec. 1989, pp. cover; 1.0-1; 1.2-16, 17, 19, 20 & 28; 2.3-1 thru 11, 15-18; 2.6-14 & 42.

*Primary Examiner*—Daniel D. Wasil
*Attorney, Agent, or Firm*—J. S. Beulick

[57] ABSTRACT

A pressure suppression containment system includes a containment vessel surrounding a reactor pressure vessel and defining a drywell therein containing a non-condensable gas. An enclosed wetwell pool is disposed inside the containment vessel, and a gravity driven cooling system (GDCS) pool is disposed above the wetwell pool in the containment vessel. The wetwell pool includes a plenum for receiving the non-condensable gas carried with steam from the drywell following a loss-of coolant-accident (LOCA). The wetwell plenum is vented to a plenum above the GDCS pool following the LOCA for suppressing pressure rise within the containment vessel. A method of operation includes channeling steam released into the drywell following the LOCA into the wetwell pool for cooling along with the non-condensable gas carried therewith. The GDCS pool is then drained by gravity, and the wetwell plenum is vented into the GDCS plenum for channeling the non-condensable gas thereto.

13 Claims, 4 Drawing Sheets

PRESSURE SUPPRESSION CONTAINMENT SYSTEM

The US Government has rights in this invention in accordance with Contract No. DE-AC03-90SF18484 awarded by the Department of Energy.

The present invention relates generally to nuclear reactors, and, more specifically, to pressure containment therein.

BACKGROUND OF THE INVENTION

A nuclear reactor plant includes a containment vessel surrounding a reactor pressure vessel and defining therewith a drywell which typically contains a non-condensable gas such as nitrogen. Disposed in the pressure vessel is a conventional nuclear reactor core submerged in water which is effective for heating the water to generate steam which is discharged from the pressure vessel for use in powering a steam turbine-generator for producing electrical power, for example.

Typically surrounding the pressure vessel within the containment vessel is an annular suppression pool or wetwell which serves various functions including being a heat sink during postulated accidents. For example, one type of accident designed for is a loss-of-coolant accident (LOCA) in which steam from the pressure vessel leaks therefrom into the drywell. Following the LOCA, therefore, the reactor is shut down but pressurized steam and residual decay heat continue to be generated for a certain time following the shutdown. In one conventional safety system, the pressure vessel is depressurized by discharging the steam into the wetwell for cooling and condensing and for preventing unacceptably large pressure increases within the containment vessel itself. An, steam escaping into the drywell is also channeled into the wetwell through conventional horizontal vents disposed therein.

Improved nuclear reactor plants are being developed to reduce or eliminate the need for AC powered safety systems following a LOCA, for example. In one design designated a Simplified Boiling Water Reactor (SBWR), a Passive Containment Cooling System (PCCS) is provided for removing heat from the containment vessel during the LOCA. One example of a PCCS is disclosed in U.S. Pat. No. 5,059,385—Gluntz et al, assigned to the present assignee, wherein the wetwell, or suppression pool, is enclosed and separated rom the drywell within the containment vessel, and a Gravity Driven Cooling System (GDCS) pool is located above the wetwell within the containment vessel and is vented to the drywell. An isolation pool is disposed outside the containment vessel and above the GDCS pool and contains a heat exchanger (Passive Containment Cooling condenser, or PCC condenser) having an inlet disposed in flow communication with the drywell, and an outlet joined to a collector chamber from which a vent pipe extends into the wetwell and a condensate return conduit extends into the GDCS pool. The PCC condenser provides passive heat removal from the containment drywell following the LOCA, with steam released into the drywell flowing through the inlet into the PCC condenser wherein it is condensed. The non-condensable gas within the drywell, such as nitrogen, is carried by the steam into the PCC condenser and must be separated therefrom to provide effective operation of the PCC condenser. The collector chamber separates the non-condensable gas from the condensate, with the separated non-condensable gas being vented into the wetwell, and the condensate being channeled into the GDCS pool.

This system relies on the pressure difference between the drywell and the wetwell, and, therefore, a water trap is provided at the end of the condensate return conduit in the GDCS pool to restrict backflow of heated fluids from the containment vessel to the wetwell via the condensate return conduit which would bypass the PCC condenser.

Accordingly, this system is configured to transport the non-condensable gas from the drywell to the wetwell and then condense steam from the drywell in the PCC condenser. The non-condensable gas will remain in the enclosed wetwell until the condenser condenses steam faster than it is released from the pressure vessel. When this occurs, the PCC condenser is effective for lowering the drywell pressure below that of the wetwell which will cause conventional vacuum breakers joined to the wetwell to open, and allow the non-condensable gas stored in the wetwell to return to the drywell.

Furthermore, the non-condensable gas within the drywell is also carried directly into the wetwell by the escaping steam which is channeled through the horizontal vents. The steam is released underwater in the wetwell and condenses therein, while the non-condensable gas is buoyed upwardly through the pool water to vent into the enclosed wetwell air chamber disposed above the pool water for its retention. As the non-condensable gas accumulates in the wetwell chamber, the pressure therein correspondingly increases. Accordingly, the overall containment pressure remains relatively high after the LOCA due to the high pressure steam escaping into the drywell, and especially in the enclosed wetwell itself due to the accumulation of the non-condensable gas, which must be suitably accommodated by providing stronger, and therefore more expensive, containment walls for example.

SUMMARY OF THE INVENTION

A pressure suppression containment system includes a containment vessel surrounding a reactor pressure vessel and defining a drywell therein containing a non-condensable gas. An enclosed wetwell pool is disposed inside the containment vessel, and a gravity driven cooling system (GDCS) pool is disposed above the wetwell pool in the containment vessel. The wetwell pool includes a plenum for receiving the non-condensable gas carried with steam from the drywell following a loss-of-coolant-accident (LOCA). The wetwell plenum is vented to a plenum above the GDCS pool following the LOCA for suppressing pressure rise within the containment vessel. A method of operation includes channeling steam released into the drywell following the LOCA into the wetwell pool for cooling along with the non-condensable gas carried therewith. The GDCS pool is then drained by gravity, and the wetwell plenum is vented into the GDCS plenum for channeling the non-condensable gas thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawing in which.

DESCRIPTION OF THE PREFERRED EMBODIMENT(S)

Figure 1:
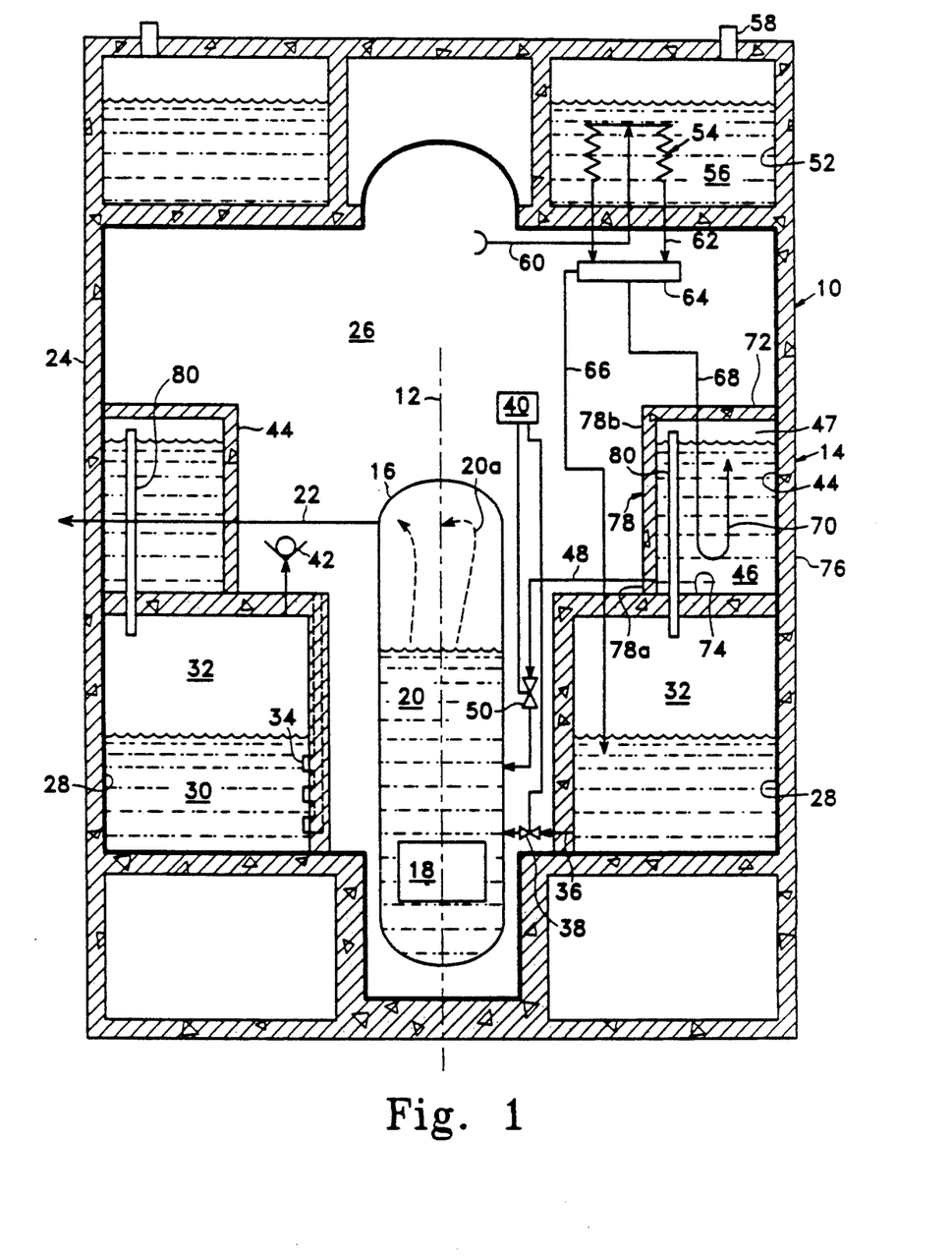
FIG. 1 is a schematic, elevational sectional view of a nuclear reactor building having a pressure suppression containment system in accordance with one embodiment of the present invention.

Illustrated schematically in FIG. 1 is an exemplary annular reactor building 10 having a longitudinal centerline axis 12. The building 10 includes a pressure suppression containment system 14 in accordance with an exemplary embodiment of the present invention. The containment system 14 includes a reactor pressure vessel 16 containing a nuclear reactor core 18 therein submerged in reactor water 20, with the core 18 being conventionally effective for heating the reactor water 20 to generate reactor steam 20a. The steam 20a is conventionally discharged from the pressure vessel 16 through a main steamline 22 joined to a conventional steam turbine-generator (not shown) for conventionally producing electrical power, for example.

An annular containment vessel, or simply containment 24 is spaced radially outwardly from the pressure vessel 16 and generally coaxial therewith to define a drywell, or plenum, 26 conventionally containing a non-condensable gas such as nitrogen. The containment 24 is a conventional concrete structure having a steel liner sized and configured for withstanding elevated pressure for safely containing the pressure vessel 16 and reactor core 18.

An enclosed annular suppression or wetwell pool 28 is disposed in the containment 24 and is conventionally partially filled with water 30 to define a wetwell plenum or airspace 32 thereabove. The wetwell pool 28 provides various conventional functions including being a heat sink and includes, for example, conventional drywell-to-wetwell vents 34 which, for example, discharge horizontally for channeling into the wetwell pool 28 any steam released from the pressure vessel 16 during a loss-of-coolant accident (LOCA) for example. Steam channeled into the wetwell pool 28 through the vents 34 carries with it portions of the non-condensable gas and is suitably quenched therein, with the non-condensable gas then being buoyed upwardly from accumulation in the wetwell plenum 32.

The wetwell pool 28 is typically disposed at least in part at an elevation above the reactor core 18 and includes means for selectively allowing gravity to drain the wetwell pool water 30 into the pressure vessel 16 for ensuring cooling of the reactor core 18 following the LOCA. Such means conventionally includes an outlet line 36 having a conventional valve 38 therein which is operatively connected to a conventional controller 40 for either automatically or manually opening the valve 38 when required. Means are also provided for selectively venting the wetwell plenum 32 into the drywell 26 when the pressure in the wetwell plenum 32 exceeds the pressure in the drywell 26 following the LOCA. Such means include one or more conventional vacuum breakers 24 disposed in flow communication with the wetwell plenum 32. The vacuum breaker 42 is normally closed when the pressure in the drywell 26 is equal or greater than the pressure in the wetwell plenum 32, and automatically opens under pressure when the pressure in the wetwell plenum 32 is suitably greater than the pressure in the drywell 26 for venting the wetwell plenum 32 into the drywell 26.

The system 14 further includes a conventional Gravity Driven Cooling System (GDCS) pool 44 disposed in the containment 24. The GDCS pool 44 is disposed at an elevation above the reactor core 18 and the wetwell pool 28, and is partially filled with water 46 therein to define a GDCS plenum 47 thereabove. Means are also provided for selectively channeling or draining by gravity the GDCS pool water 46 into the pressure vessel 16 for cooling the reactor core 18 following the LOCA in a conventional manner. Such means include a conventional outlet line 48 and valve 50 therein disposed in flow communication between the GDCS pool 44 and the pressure vessel 16, with the valve 50 being conventionally operatively joined to the controller 40 so that it may be conventionally opened when required for allowing the GDCS pool water 46 to flow by gravity into the pressure vessel 16 in a conventional manner.

A conventional annular isolation pool 52 is disposed in the reactor building 10 above the containment 24 and at an elevation above the GDCS pool 44 as part of a conventional Passive Containment Cooling System (PCCS). The isolation, or PCCS, pool 52 contains a preferably vertically extending heat exchanger also referred to as a PCC condenser 54 submerged in isolation water 56. The isolation pool 52 includes one or more vents 58 to atmosphere outside the containment 24 and building 10 for venting the airspace above the isolation pool water 56 for discharging heat therefrom upon use of the PCC condenser 54.

The PCC condenser 54 is conventional and includes an inlet line 60 preferably disposed in direct flow communication with the drywell 26 by having an open end disposed therein for receiving the non-condensable gas along with any steam released from the pressure vessel 16 into the drywell 26 following the LOCA. In the event of a LOCA, stem is released into the drywell 26 and has a pressure greater than the pressure within the wetwell plenum 32. The steam will, therefore, also flow into the inlet line 60 and carry with it the non-condensable gas originally contained in the drywell 26. The steam is then conventionally cooled in the coils of the PCC condenser 54 by the isolation pool water 56 with the heat liberated therefrom being vented through the vent 58 to the atmosphere, and the resulting condensate therefrom being discharged from the PCC condenser 54 through one or more outlet lines 62.

A conventional collector chamber, or simply collector 64 is disposed in flow communication with the condenser outlet line 62 and has a gas vent line 66 conventionally disposed in flow communication with the wetwell pool 28, and further has a liquid condensate drain line 68 conventionally disposed in flow communication with the GDCS pool 44. The drain line 68 has a conventional U-shaped distal end 70 disposed in the GDCS pool 44 under the pool water 46 for forming a conventional water trap or loop seal, also designated 70. The loop seal 70 allows discharge of the condensate from the collector 64 into the GDCS pool 44 and restricts backflow through the drain line 68 and upwardly toward the collector 64.

In conventional operation, steam released into the drywell 26 following the LOCA is channeled through the vents 34 into the wetwell pool 28 for condensing, and through the inlet line 60 to the PCC condenser 54 which removes heat therefrom and forms the condensate carried through the outlet line 62 into the collector 64. The non-condensable gas carried with the steam through the PCC condenser 54 is separated in the collector 64, with the separated non-condensable gas being vented through the vent line 66 into the wetwell pool 28 wherein it accumulates in the wetwell plenum 32 above the wetwell water 30. The condensate from the collector 64 is discharged through the drain line 68 into the GDCS pool 44. The non-condensable gas carried into the wetwell pool 28 through the vents 34 is buoyed upwardly therein and also accumulates in the wetwell plenum 32.

As the non-condensable gas accumulates in the wetwell plenum 32, the pressure therein increases until the PCC condenser 54 condenses steam faster than it is released from the pressure vessel 16. At such time, the pressure within the drywell 26 will fall below that of the pressure in the wetwell plenum 32 which will cause the vacuum breakers 42 to open and return a portion of the non-condensable gas from the wetwell plenum 32 to the drywell 26. However, this gas will then be allowed to flow again into the PCC condenser 54 and lower its effectiveness until the steam being released in the drywell 26 again increases the pressure therein above that of the wetwell plenum 32 at which time the vacuum breakers 42 will close and the cycle will be repeated with the non-condensable gas being vented from the PCC condenser 54 into the wetwell plenum 32 wherein it again accumulates with rising pressure.

This operation of continually returning the non-condensable gas to the wetwell plenum 32 results in a relatively high overall pressure in the containment 24 especially in the wetwell plenum 32. Furthermore, incremental heating of the top layer of the wetwell pool water 30 occurs each time the non-condensable gas is vented from the PCC condenser 54 into the wetwell plenum 32, and any small steam leakage through the vacuum breakers 42 and into wetwell plenum 32 also causes the pressure of wetwell plenum 32 to rise, which in turn will cause pressure in the containment 24 to slowly rise.

The size of the wetwell plenum 32 is predetermined to ensure a suitable volume of airspace therein for accumulating the non-condensable gas for limiting the pressure rise within the wetwell pool 28, as well as in the drywell 26 and the entire containment 24. However, since the GDCS pool 44 is drained of most if not all of its water 46 following the LOCA, its empty volume may be used to advantage in the pressure suppression system 14 in accordance with the present invention for providing airspace volume in addition to the wetwell plenum 32 in which the non-condensable gas may accumulate following the LOCA. A conventional GDCS pool is either open or includes a vent at its top in direct flow communication with the drywell 26, and, therefore, following draining of the GDCS pool during the LOCA, the empty volume of the GDCS pool merely becomes an extension of the drywell 26. In order to effectively use the drained GDCS pool 44, the GDCS pool 44 in accordance with the present invention is enclosed as illustrated in FIG. 1 and has a top 72, a bottom 74, an outer sidewall 76, and an inner sidewall 78. The inner sidewall 78 faces inwardly toward the drywell 26 and is suitably sealingly joined at its bottom end 78a to the pool bottom 74 and sealingly joined at its top end 78b to the pool top 72. In the is way, the GDCS pool 44 is completely sealed or isolated from the drywell 26 to prevent gas flow therebetween. In the exemplary embodiment illustrated in FIG. 1, a plurality of identical GDCS pools 44 are used which may include two, three, or more as desired.

Figure 2:
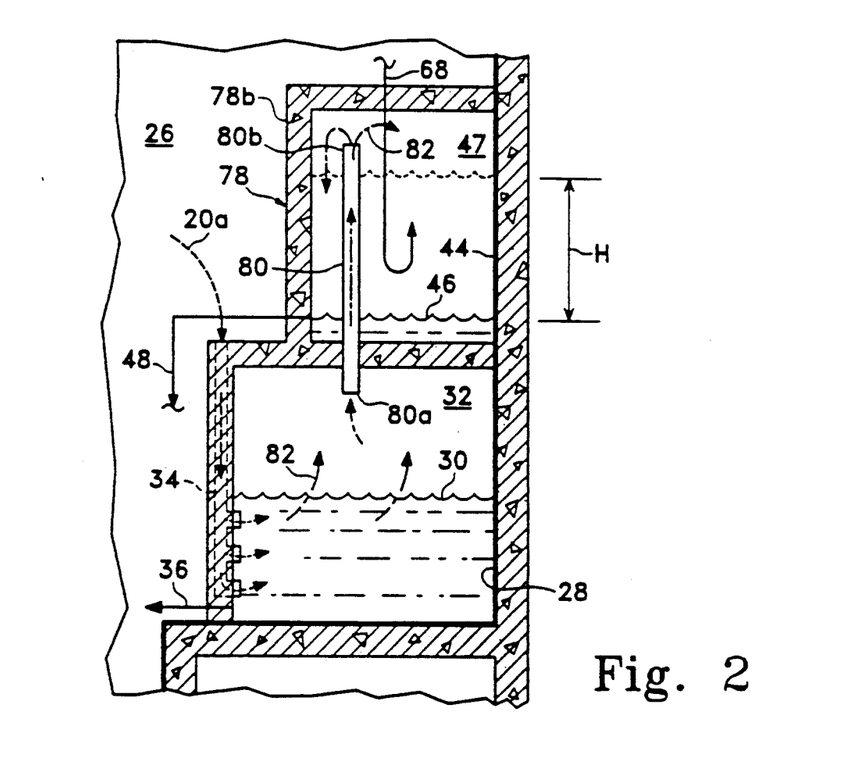
FIG. 2 is an enlarged view of a portion of the reactor building illustrated in FIG. 1 and showing a gravity driven cooling system (GDCS) pool disposed above a wetwell pool in a containment vessel.

Since the GDCS pool 44 is now isolated from the drywell 26, after it is drained of its water 46 following the LOCA the enlarged airspace of the GDCS plenum 47 may be used in accordance with the present invention for providing additional volume within the containment 24 for accumulating the non-condensable gas from the drywell 26. FIG. 1 illustrates the GDCS pools 44 filled to their highest level prior to the LOCA, and FIG. 2 illustrates one of the GDCS pools 44 drained to its lowest level at the location of the outlet line 48. The vertical height H illustrated in FIG. 2 represents the additional volume created in the GDCS pool 44 between its full (shown in phantom) and empty conditions.

Accordingly then, means are provided in accordance with the present invention for venting the wetwell plenum 32 to the GDCS plenum 47 for channeling the non-condensable gas initially accumulating in the wetwell plenum 32 following the LOCA into the additional airspace provided by the empty GDCS pool 44. In the exemplary embodiment illustrated in FIGS. 1 and 2, the venting means include a venting channel in the exemplary form of a standpipe 80 extending vertically from the wetwell plenum 32 to the GDCS plenum 47 in flow communication therebetween. The standpipe 80 includes an inlet 80a at a bottom end thereof disposed in flow communication with the wetwell plenum 32 for receiving the non-condensable gas (designated 82) accumulating therein following the LOCA, and an outlet 80b at a top end thereof disposed in flow communication with the GDCS plenum 47 at an elevation preferably above the original high water level within the GDCS pool 44 for discharging the non-condensable gas 82 channeled through the standpipe 80 into the GDCS plenum 47. In a simple embodiment illustrated in FIG. 2, the GDCS pool 44 is fully isolated from the drywell 26, and the standpipe inlet 80a and outlet 80b are simply open ends disposed respectively in the wetwell plenum 32 and the GDCS plenum 47.

Accordingly, this apparatus may be used for practicing an improved method for pressure suppression of the containment vessel 24 in accordance with the present invention. More specifically, following a LOCA, the method includes channeling the steam 20a released into the drywell 26 through the vents 34 into the wetwell pool 28 for cooling the steam 20a, with the non-condensable gas 82 from the drywell 26 being carried with the steam 20a being buoyed upwardly through the pool water 30 and accumulating in the wetwell plenum 32. The method also includes draining by gravity the GDCS pool water 46 into the pressure vessel 16 by suitably opening the valve 50. As the water 46 drains from the GDCS pool 44, the GDCS airspace plenum 47 increases in volume. The standpipe 80 then allows for natural venting of the wetwell plenum 32 into the GDCS plenum 47 for allowing the non-condensable gas 82 to flow from the wetwell plenum 32 and into the additional space provided by the GDCS plenum 47.

In an exemplary embodiment, the wetwell plenum 32 has an airspace volume of about 3,300 cubic meters, and the empty GDCS plenum 47 has an airspace volume of about 1,000 cubic meters. By utilizing the GDCS plenum 47 to augment the wetwell plenum 32 within the containment vessel 24, the total space available for accumulating the non-condensable gas 82 is increased by about 30% which correspondingly decreases the pressure of the non-condensable gases 82 within this airspace by about 30%. Accordingly, the containment vessel 24 may be designed for the reduced pressure which saves cost, or an enhanced pressure margin may be obtained for improved safety of operation.

As shown in FIG. 2, the GDCS pool 44 may be formed as a concrete enclosure for fully enclosing the GDCS plenum 47. In an alternate embodiment of the invention illustrated in FIG. 3, the inner sidewall 78 may be integrally formed with the pool bottom 74, with the inner sidewall top 78b being disposed in a groove 84 defined between a pair of suitable metal flanges 86 facing downwardly from the pool top 72 to form an effective joint for supporting the inner sidewall 78 to the pool top 72 while allowing some flexibility of the pool top 72 relative thereto when the drywell 26 experiences a pressure increase such as that following a LOCA, for example. In the embodiment illustrated in FIG. 3, the pool top 72 also forms a portion of the top of the containment vessel 24, and during a LOCA, pressurization in the drywell 26 will elastically deflect upwardly the pool top 72, with the flanges 86 maintaining structural restraint for the inner sidewall 78 while allowing relative movement therebetween. In order to seal the joint formed between the inner sidewall top 78b and the flanges 86, a conventional bellows seal 88 is disposed inside the GDCS plenum 47 and sealingly joined to the inner sidewall 78 and the pool top 72 in a conventional fashion for preventing flow communication of the non-condensable gas 82 between the GDCS plenum 47 and the drywell 26. In this way, the non-condensable gas 82 may accumulate in the airspace provided following draining of the GDCS pool 44 without reintroduction into the drywell 26.

Figure 4:
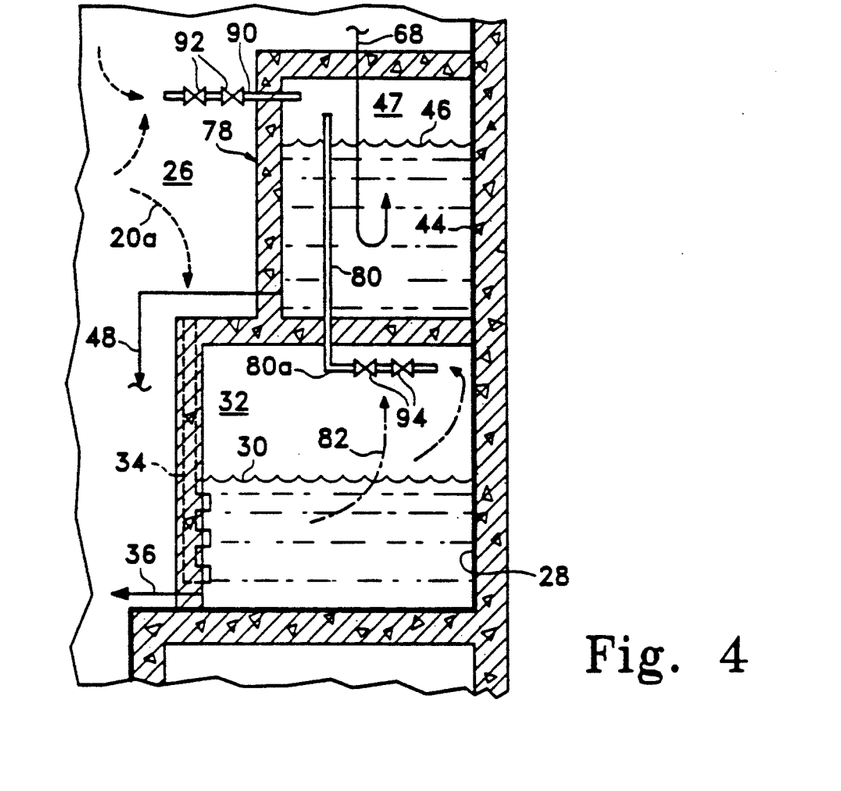
FIG. 4 is an enlarged view of the GDCS pool and the wetwell pool illustrated in FIG. 1 in accordance with another embodiment of the present invention having valves for controlling flow into a plenum above the GDCS pool.

Illustrated in FIG. 4 is another embodiment of the present invention including a vent line 90 disposed in flow communication between the GDCS plenum 47 and the drywell 26 which extends through the inner sidewall 78 in the otherwise fully enclosed GDCS plenum 47. At least one and preferably two first valves 92 are disposed in series in the vent line 90 for controlling flow communication between the drywell 26 and the GDCS plenum 47. Similarly, at least one and preferably two second valves 94 are disposed in series at the standpipe inlet 80a for controlling flow communication between the GDCS plenum 47 and the wetwell plenum 32 through the standpipe 80. The series valves 92, 94 ensure redundancy of operation for enhanced safety. The first valve 92 is preferably a normally closed valve when de-energized which is initially powered open during normal operation of the reactor and prior to draining of the GDCS pool water 46 following the LOCA. In this way a flow communication or venting path is provided directly between the drywell 26 and the GDCS plenum 47. The second valves 94 are preferably normally closed valves when de-energized which remain initially closed prior to the LOCA to prevent flow communication between the GDCS plenum 47 and the wetwell plenum 32. In this way, the GDCS pool 44 may operate normally upon initiation of the LOCA as the GDCS pool water 46 is allowed to drain by gravity through the outlet line 48. The vent line 90 ensures pressure equalization between the drywell 26 and the GDCS plenum 47 during draining of the pool 44 and reduces the differential pressure acting across the inner sidewall 78 for reducing loads thereon and the required strength thereof.

However, once the GDCS pool water 46 has substantially drained from the pool 44 following the LOCA, the first valves 92 are conventionally signaled closed by the controller 40 operatively joined thereto, and the second valves 94 are signaled open by the controller 40 operatively joined thereto. The first valves 92 are positioned closed after the water 46 is drained from the pool 44 following the LOCA to isolate the pool 44 and the plenum 47 from the drywell 26. The second valves 94 are positioned opened after the pool water 46 is drained following the LOCA to channel the non-condensable gas 82 from the wetwell plenum 32 to the now substantially empty GDCS plenum 47 for accumulation therein, and with the desirable result of reducing the overall pressure within the containment vessel 24 as described above. In the event of a power failure, the first and second valves 92 and 94 will fail closed to ensure effective operation of the GDCS pool 44 following the LOCA.

Figure 5:
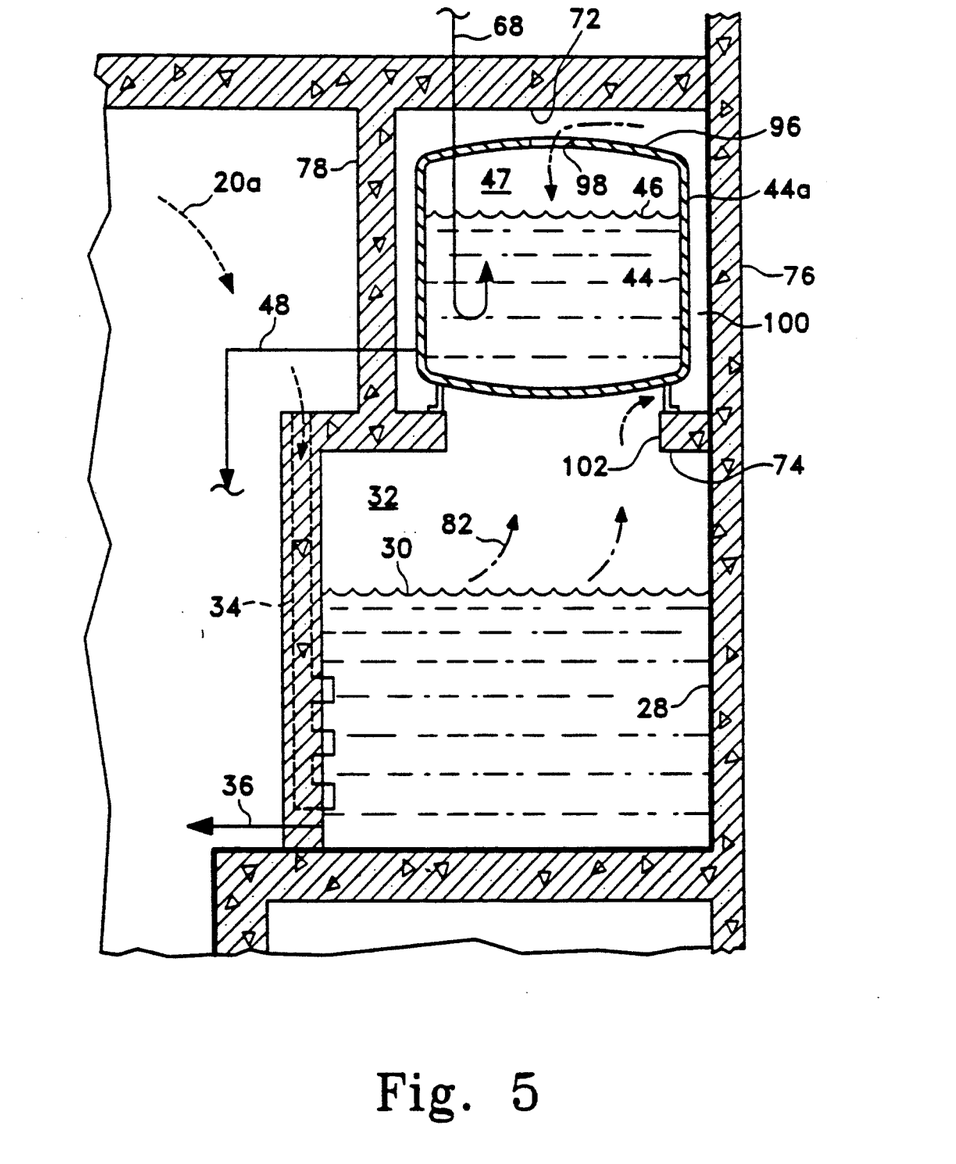
FIG. 5 is an enlarged view of the GDCS pool and wetwell pool illustrated in FIG. 1 in accordance with another embodiment of the present invention wherein the GDCS pool is in the form of a tank disposed in an extended portion of the plenum above the wetwell pool.

Illustrated in FIG. 5 is yet another embodiment of the present invention wherein the GDCS pool 44 is in the form of a metal tank 44a disposed between the outer and inner sidewalls 76, 78 which extend upwardly from the wetwell plenum 32, with the sidewalls 76, 78 being vertical extensions of the wetwell plenum 32 for providing one larger wetwell plenum 32 in which is disposed the GDCS tank 44a. The tank 44a preferably has an enclosed top 96 with a central top aperture 98 therein disposed in flow communication between the GDCS plenum 47 inside the tank 44a and the wetwell plenum 32. In this embodiment, the tank 44a is spaced inwardly from the sidewalls 76, 78 to define a venting channel 100 therebetween surrounding the tank 44a and extending downwardly in flow communication with the wetwell plenum 32. As illustrated in FIG. 5, the GDCS pool bottom 74 includes a large aperture 102 therein providing the direct flow communication between the wetwell plenum 32 and the venting channel 100 with the tank 44a being suitably supported on the GDCS pool bottom 74. Also in this embodiment, the tank 44a is effective for containing any sloshing of the GDCS pool water 46 therein following any seismic occurrence, and since the tank 44a is made of metal, it provides an effective pressure vessel for use in the various embodiments of the invention described above. Although the top aperture 98 may be simply a hole in direct communication with the venting channel 100, in alternate embodiments a suitable conduit may extend from the top aperture 98 and downwardly in flow communication with the wetwell plenum 32 if desired.

Figure 3:
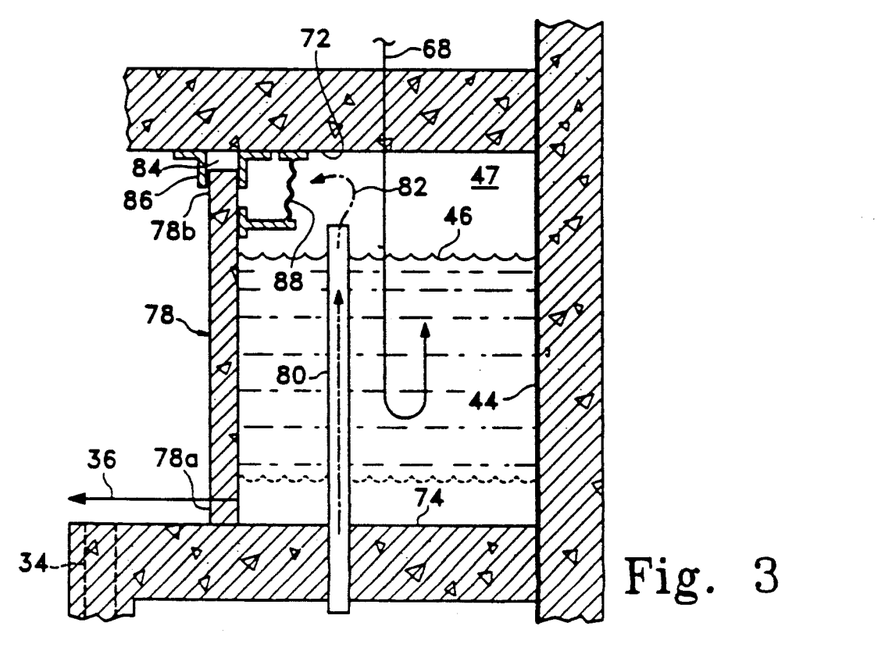
FIG. 3 is an enlarged view of the GDCS pool illustrated in FIG. 1 in accordance with an alternate embodiment of the present invention.
Figure 6:
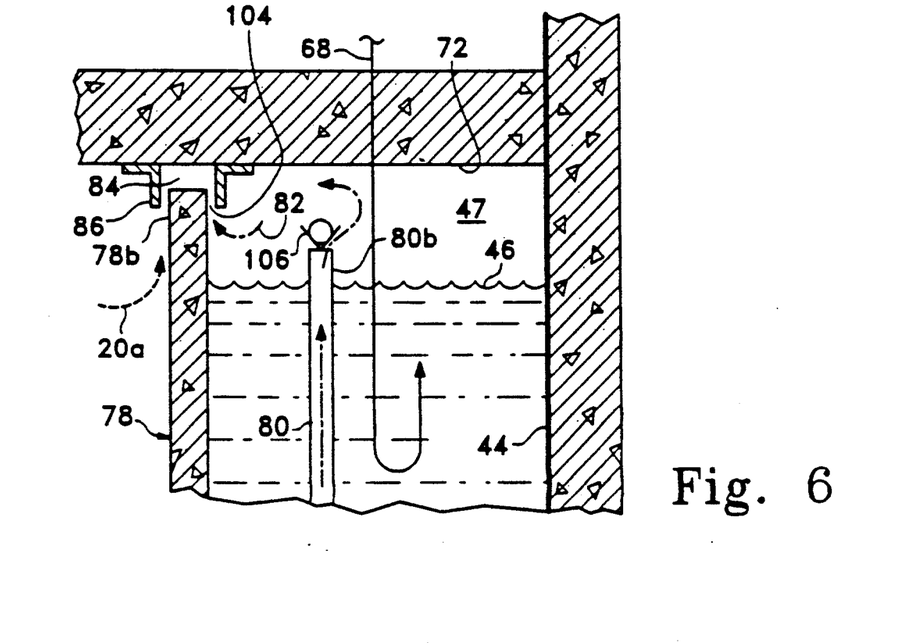
FIG. 6 is an enlarged view of a portion of the GDCS pool in accordance with another embodiment of the present invention wherein the GDCS plenum includes a restricted orifice joining the drywell, and a check valve is provided for preventing backflow from the GDCS plenum into the wetwell plenum.

Illustrated in FIG. 6 is another embodiment of the present invention wherein the inner sidewall top end 78b is again disposed in the groove 84 facing downwardly from the pool top 72 to define a predetermined gap or orifice 104 between the inner sidewall 78 and the flanges 86, with the bellows seal 88 illustrated in FIG. 3 not being used. The orifice 104 is predeterminedly sized for allowing restricted gas flow therethrough so that pressure in the GDCS plenum 47 substantially follows pressure in the drywell 26 as the GDCS pool water 46 is draining by gravity from the GDCS pool 44 following the LOCA. In this way, the GDCS plenum 47 will follow the LOCA-produced transient drywell pressure relatively closely within one or two pounds per square inch dynamic (psid), for example. In this embodiment, however, the standpipe 80 preferably includes a vacuum breaker or check valve 106 on its outlet 80b to prevent drywell gas backflow through the GDCS plenum 47 and into the wetwell plenum 32 while allowing forward flow therethrough from the standpipe inlet 80a to the outlet 80b thereof.

This embodiment eliminates the active-type valves and their control systems as in the embodiment illustrated in FIG. 4 to provide a fully passive system for controlling flow through the GDCS plenum 47. The check valve 106 performs the conventional function of the wetwell-to-drywell vacuum breakers 42 illustrated in FIG. 1 which may instead be located within the GDCS plenum 47 in the form of the check valve 106. In this way, the non-condensable gas 82 is vented from the wetwell plenum 32 through the standpipe 80 into the GDCS plenum 47 and not directly into the drywell 26. Since the orifice 104 provides a limited flow area between the GDCS plenum 47 and the drywell 26, the non-condensable gas 82 is effectively trapped within the GDCS plenum 47 with little if any being returned to the nominally higher pressure drywell 26 following the LOCA. By so trapping the non-condensable gas 82 within the additional volume provided by the GDCS plenum 47, the overall pressure of the containment vessel 24 will be reduced. And, the performance of the PCC condenser 54 (see FIG. 1) will remain unaffected.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A pressure suppression containment system comprising:
   a reactor pressure vessel containing a reactor core therein submerged in reactor water, said core being effective for heating said reactor water to generate steam;
   a containment vessel spaced outwardly from said pressure vessel to define a drywell containing a non-condensable gas;
   an enclosed wetwell pool disposed in said containment vessel and partially filled with water to define a wetwell plenum thereabove, said wetwell pool having a drywell-to-wetwell vent disposed in flow communication with said drywell for venting from said drywell to said wetwell pool steam released into said drywell following a loss-of-coolant-accident (LOCA) along with said non-condensable gas carried therewith;
   a gravity driven cooling system (GDCS) pool disposed in said containment vessel at an elevation above said reactor core and said wetwell pool, and partially filled with water to define a GDCS plenum thereabove;
   means for selectively channeling by gravity said GDCS pool water into said pressure vessel following said LOCA; and
   means for venting said wetwell plenum to said GDCS plenum for channeling said non-condensable gas thereto.

2. A system according to claim 1 wherein said venting means comprise a venting channel disposed in flow communication between said wetwell plenum and said GDCS plenum, and having an inlet at a bottom end thereof for receiving said non-condensable gas from said wetwell plenum, and an outlet at a top end thereof for discharging said non-condensable gas into said GDCS plenum.

3. A system according to claim 2 wherein said GDCS pool and plenum are isolated from said drywell to prevent gas flow therebetween.

4. A system according to claim 3 wherein said GDCS pool is an enclosed pool having a top, a bottom, an outer sidewall, and an inner sidewall, said inner sidewall facing said drywell and sealingly joined at a bottom end thereof to said pool bottom and sealingly joined at a tope end thereof to said pool top.

5. A system according to claim 4 wherein said inner sidewall top is disposed in a groove facing downwardly from said pool top, and further including a bellows seal disposed inside said GDCS plenum and sealingly joined to said inner sidewall and said pool top for preventing flow of said non-condensable gas between said GDCS plenum and said drywell.

6. A system according to claim 3 further comprising:
   a vent line disposed in flow communication between said GDCS plenum and said drywell;
   a first valve disposed in said vent line and being initially open prior to draining of said GDCS pool water following said LOCA, and being positionable closed after said GDCS pool water is drained from said GDCS pool following said LOCA to isolate said GDCS pool and said plenum from said drywell; and
   a second valve disposed at said venting channel inlet and being initially closed prior to said LOCA to prevent flow communication between said GDCS plenum and said wetwell plenum, and being positionable open after said GDCS pool water is drained from said GDCS pool following said LOCA to channel said non-condensable gas from said wetwell plenum to said GDCS plenum.

7. A system according to claim 3 wherein said venting channel is in the form of a standpipe extending vertically from said wetwell plenum to said GDCS plenum.

8. A system according to claim 3 wherein said GDCS pool is in the form of a tank disposed between sidewalls extending upwardly from said wetwell plenum, and has a top aperture disposed in flow communication between said GDCS plenum inside said tank and said wetwell plenum.

9. A system according to claim 8 wherein said tank is spaced inwardly from said sidewalls to define said venting channel surrounding said tank and extending downwardly in flow communication with said wetwell plenum.

10. A system according to claim 2 wherein:
said GDCS pool is an enclosed pool having a top, a bottom, an outer sidewall, and an inner sidewall, said inner sidewall facing said drywell and sealingly joined at a bottom end thereof to said pool bottom, and joined at a top end thereof in a groove facing downwardly from said pool top to define an orifice sized for allowing restricted gas flow therethrough so that pressure in said GDCS plenum substantially follows pressure in said drywell as said GDCS pool water is draining by gravity from said GDCS pool following said LOCA; and
said venting channel includes a check valve at said outlet thereof for preventing backflow therethrough while allowing forward flow therethrough from said inlet to said outlet thereof.

11. A method for suppressing pressure in a containment vessel spaced outwardly from a pressure vessel defining a drywell therebetween, said pressure vessel including a nuclear reactor core, and said containment vessel including an enclosed wetwell pool having a plenum thereabove, and a gravity driven cooling system (GDCS) pool having a plenum thereabove and disposed above said wetwell pool, said method comprising:
channeling steam released into said drywell following a loss-of-cooling accident (LOCA) into said wetwell pool for cooling along with non-condensable gas contained in said drywell and carried along with said steam;
draining by gravity said GDCS pool water into said pressure vessel; and
venting said wetwell plenum into said GDCS plenum.

12. A method according to claim 11 further comprising:
isolating said GDCS plenum from said drywell to prevent gas flow therebetween after said GDCS pool water is substantially drained from said GDCS pool.

13. A method according to claim 12 wherein said containment vessel further includes a first valve disposed in flow communication between said GDCS plenum and said drywell, and a second valve disposed in flow communication with said wetwell plenum, and said method further comprises maintaining said first valve open and said second valve closed prior to said LOCA, and then closing said first valve and opening said second valve after draining said GDCS pool water from said GDCS pool following said LOCA.

* * * * *